US009344009B2

(12) United States Patent
Endo

(10) Patent No.: US 9,344,009 B2
(45) Date of Patent: *May 17, 2016

(54) INVERTER CIRCUIT, POWER CONVERTER CIRCUIT, AND ELECTRIC VEHICLE

(71) Applicant: Semiconductor Energy Laboratory Co., Ltd., Atsugi-shi, Kanagawa-ken (JP)

(72) Inventor: Masami Endo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,081

(22) Filed: Jul. 14, 2014

(65) Prior Publication Data

US 2014/0321180 A1     Oct. 30, 2014

Related U.S. Application Data

(63) Continuation of application No. 13/192,885, filed on Jul. 28, 2011, now Pat. No. 8,780,598.

(30) Foreign Application Priority Data

Aug. 4, 2010  (JP) .................................. 2010-175001

(51) Int. Cl.
  *H02M 7/538*  (2007.01)
  *H02M 7/5387*  (2007.01)
  *B60L 15/00*  (2006.01)

(52) U.S. Cl.
  CPC ........... *H02M 7/5387* (2013.01); *B60L 15/007* (2013.01); *H02M 7/53871* (2013.01)

(58) Field of Classification Search
  CPC ......... H02M 7/00; H02M 7/02; H02M 7/003; H02M 7/537; H02M 7/538; H02M 7/5387
  USPC ............ 363/16, 17, 40, 56.01, 56.02, 71, 97, 363/98, 109, 131, 132
  See application file for complete search history.

(56) References Cited

U.S. PATENT DOCUMENTS

| | | | |
|---|---|---|---|
| 6,198,198 B1 | 3/2001 | Fujimura et al. | |
| 6,239,558 B1 | 5/2001 | Fujimura et al. | |
| 6,927,989 B2 | 8/2005 | Fukumoto | |
| 7,158,390 B2 * | 1/2007 | Choi et al. | ....................... 363/17 |
| 7,310,475 B2 * | 12/2007 | Okuda et al. | .................. 388/805 |

(Continued)

FOREIGN PATENT DOCUMENTS

| | | |
|---|---|---|
| CN | 100530926 C | 8/2009 |
| JP | 01-311872 A | 12/1989 |

(Continued)

OTHER PUBLICATIONS

Taiwanese Office Action (Application No. 100126777) Dated Jun. 3, 2015.

*Primary Examiner* — Yemane Mehari
(74) *Attorney, Agent, or Firm* — Fish & Richardson P.C.

(57) ABSTRACT

An object is to reduce, with the control circuit of the full-bridge inverter circuit, distortions in an output signal of the inverter circuit resulting from an error in control of the switching of the high-side transistors and low-side transistors included in the first half-bridge circuit and the second half-bridge circuit. The pulse width of a signal that controls ON/OFF of the high-side transistors and low-side transistors included in the first half-bridge circuit and the second half-bridge circuit is reduced, i.e., the duty cycle of the signal is reduced. This results in a reduction in short-circuit periods during which both the high-side transistor and the low-side transistor are on, thereby reducing distortions in a signal.

13 Claims, 12 Drawing Sheets

(56) References Cited

U.S. PATENT DOCUMENTS

| | | | |
|---|---|---|---|
| 7,515,445 B2 * | 4/2009 | Lin | 363/98 |
| 8,780,598 B2 * | 7/2014 | Endo | 363/132 |

FOREIGN PATENT DOCUMENTS

| | | |
|---|---|---|
| JP | 02-307370 A | 12/1990 |
| JP | 07-031163 A | 1/1995 |
| JP | 07-046859 A | 2/1995 |
| JP | 10-150790 A | 6/1998 |
| JP | 10-285942 A | 10/1998 |
| JP | 2003-031388 A | 1/2003 |
| JP | 2003-110364 A | 4/2003 |
| JP | 2003-348829 A | 12/2003 |
| JP | 2008-099466 A | 4/2008 |
| JP | 2008-301192 A | 12/2008 |
| TW | I317200 | 11/2009 |

* cited by examiner

INVERTER CIRCUIT, POWER CONVERTER CIRCUIT, AND ELECTRIC VEHICLE

CROSS-REFERENCE TO RELATED APPLICATIONS

This application is a continuation of U.S. application Ser. No. 13/192,885, filed Jul. 28, 2011, now allowed, which claims the benefit of a foreign priority application filed in Japan as Serial No. 2010-175001 on Aug. 4, 2010, both of which are incorporated by reference.

BACKGROUND OF THE INVENTION

1. Field of the Invention

The present invention relates to an inverter circuit, a power converter circuit including an inverter circuit, or an electric vehicle including a power converter circuit.

2. Description of the Related Art

Power devices are indispensable elements for drive controllers of high-power electric appliances such as vacuum cleaners and washing machines. In recent years, power devices are beginning to be applied to electric vehicles such as electric cars. Therefore, research and development of power devices which may create a larger market in future are being active.

There are many examples of power devices, such as switching elements for use of high power, DCDC converter circuits, and inverter circuits. An inverter circuit can be used in an insulated DCDC converter circuit but it acts as a DC (direct current)-AC (alternate current) converter circuit when used alone. Inverter circuits are important for lower power consumption and downsizing of devices.

Among inverter circuits, half-bridge inverter circuits and full-bridge inverter circuits which enable bidirectional excitation of transformers produce high utilization efficiency. A full-bridge inverter circuit allows a voltage input thereto to be used by a transformer without being lost, thereby producing great power conversion efficiency. Full-bridge inverter circuits are therefore suitable particularly for use of high power.

In a full-bridge inverter circuit, control of the switching of transistors in half-bridge circuits is important for efficient power conversion. Each of the half-bridge circuit includes a high-side transistor and a low-side transistor. A control circuit in the full-bridge inverter circuit controls the switching of the high-side and low-side transistors in each of the half-bridge circuits.

Patent Document 1 discloses a method for controlling a full-bridge inverter circuit.

REFERENCE

Patent Document

[Patent Document 1] Japanese Published Patent Application No. H7-31163

SUMMARY OF THE INVENTION

In a full-bridge inverter circuit, the switching of a first half-bridge circuit and second half-bridge circuit is controlled by a pulse width modulation circuit that outputs a signal for controlling the ON period of a high-side transistor and low-side transistor, which signal is generated from a sine wave or sawtooth wave (or pyramidal wave). The first half-bridge circuit and the second half-bridge circuit are alternately selected, so that ON/OFF of their high-side transistors and low-side transistors are controlled.

FIG. 12A illustrates a simple inverter circuit including half-bridge circuits. An inverter circuit 400 in FIG. 12A receives a DC signal from a DC power source 401 through input terminals IN1 and IN2, and outputs an AC signal through output terminals OUT1 and OUT2. The inverter circuit 400 includes a first half-bridge circuit 402, a second half-bridge circuit 403, and a pulse width modulation circuit 404.

The first half-bridge circuit 402 includes a high-side transistor 405 and a low-side transistor 406. The second half-bridge circuit 403 includes a high-side transistor 407 and a low-side transistor 408. ON/OFF of the high-side transistor 405 is controlled by a control signal A from the pulse width modulation circuit 404. ON/OFF of the low-side transistor 406 is controlled by a control signal C from the pulse width modulation circuit 404. ON/OFF of the high-side transistor 407 is controlled by a control signal B from the pulse width modulation circuit 404. ON/OFF of the low-side transistor 408 is controlled by a control signal D from the pulse width modulation circuit 404.

FIG. 12B is a simple timing diagram of the waveforms of a sine wave and a sawtooth wave and the waveforms of the control signals A to D in FIG. 12A. The timing diagram of FIG. 12B illustrates a sine wave 411 and a sawtooth wave 412. The control signals A and B control ON/OFF with the same timing. The control signals C and D control ON/OFF with the same timing. The control signals A to D control ON/OFF by modulating the pulse width, resulting in an AC signal with smaller distortions.

In order to control the switching of the high-side transistor and the low-side transistor, ideally, the pulse widths of the signals that control ON periods of these transistors are adjusted to alternately turn on or off these transistors. If the high-side transistor and the low-side transistor are simultaneously turned on as a result, for example, of a delay in the turn-on time and/or turn-off time of a transistor included in a control circuit, distortions are caused in a signal output from the inverter circuit.

As an example, as shown in FIG. 12C, when the control signals A and C and the control signals B and D are subjected to pulse width modulation, intervals T of their pulse widths are shortened. On the other hand, a delay in the turn-on time and/or turn-off time of a transistor included in the control circuit or the like causes a control signal to require longer time to rise or fall. Consequently, a short-circuit period during which both the high-side transistor and the low-side transistor are on is increased. During this short-circuit period, particularly at the time of switching between the ON and OFF states of the first half-bridge circuit and the second half-bridge circuit, distortions are caused in a signal output from the inverter circuit.

In view of the above problem, an object of one embodiment of the present invention is to reduce, by a contrivance in the control circuit of the full-bridge inverter circuit, distortions in a signal output from the inverter circuit resulting from an error in control of the switching of the high-side transistors and low-side transistors included in the first half-bridge circuit and the second half-bridge circuit.

In order to solve the above problem, one embodiment of the present invention reduces the pulse width of a signal that controls ON/OFF of the high-side transistors and low-side transistors included in the first half-bridge circuit and the second half-bridge circuit, i.e., reduces the duty cycle of the signal. This results in a reduction in short-circuit periods during which both the high-side transistor and the low-side transistor are on, thereby reducing distortions in a signal.

According to one embodiment of the present invention, an inverter circuit is provided. The inverter circuit comprises a full-bridge circuit and a pulse width modulation circuit controlling the full-bridge circuit. The full-bridge circuit comprises: a first half-bridge circuit comprising a first high-side transistor and a first low-side transistor; and a second half-bridge circuit comprising a second high-side transistor and a second low-side transistor. The pulse width modulation circuit comprises a circuit controlling the first high-side transistor and the first low-side transistor in accordance with a signal given by AND operation of a first output signal generated by a first comparator on the basis of a sine wave and a first sawtooth wave and a first control signal based on a signal generated from higher-order bits of a digital signal used to generate the first sawtooth wave; and a circuit controlling the second high-side transistor and the second low-side transistor in accordance with a signal given by AND operation of a second output signal generated by a second comparator on the basis of the sine wave and a second sawtooth wave out of phase with the first sawtooth wave by half a cycle and an inverted signal of a second control signal based on a signal generated from higher-order bits of a digital signal used to generate the second sawtooth wave.

According to one embodiment of the present invention, an inverter circuit is provided. The inverter circuit comprises a full-bridge circuit and a pulse width modulation circuit controlling the full-bridge circuit. The full-bridge circuit comprises a first half-bridge circuit comprising a first high-side transistor and a first low-side transistor; and a second half-bridge circuit comprising a second high-side transistor and a second low-side transistor. The pulse width modulation circuit comprises: a circuit controlling the first high-side transistor in accordance with a first signal given by AND operation of a first output signal generated by a first comparator on the basis of a sine wave and a first sawtooth wave and a first control signal based on a signal generated from higher-order bits of a digital signal used to generate the first sawtooth wave and controlling the first low-side transistor in accordance with an inverted signal of the first signal; and a circuit controlling the second high-side transistor in accordance with a second signal given by AND operation of a second output signal generated by a second comparator on the basis of the sine wave and a second sawtooth wave out of phase with the first sawtooth wave by half a cycle and an inverted signal of a second control signal based on a signal generated from higher-order bits of a digital signal used to generate the second sawtooth wave and controlling the second low-side transistor in accordance with an inverted signal of the second signal.

According to one embodiment of the present invention, the first signal and the second signal may be fed into gates of transistors in the first half-bridge circuit and the second half-bridge circuit through level shifters.

According to one embodiment of the present invention, the sine wave may be a signal produced by generating a digital sine wave signal with a digital sine wave signal generator circuit and converting the digital sine wave signal into an analog signal.

According to one embodiment of the present invention, the first sawtooth wave may be a signal produced by generating a digital signal used to generate the first sawtooth wave with a first digital sawtooth wave signal generator circuit and converting the digital signal used to generate the first sawtooth wave into an analog signal.

According to one embodiment of the present invention, the second sawtooth wave may be a signal produced by generating a digital signal used to generate the second sawtooth wave with a second digital sawtooth wave signal generator circuit and converting the digital signal used to generate the second sawtooth wave into an analog signal.

One embodiment of the present invention can reduce, by a contrivance in the control circuit of the full-bridge inverter circuit, distortions in an output signal of the inverter circuit resulting from an error in control of the switching of the high-side transistors and low-side transistors included in the first half-bridge circuit and the second half-bridge circuit.

DETAILED DESCRIPTION OF THE INVENTION

Figure 1A:
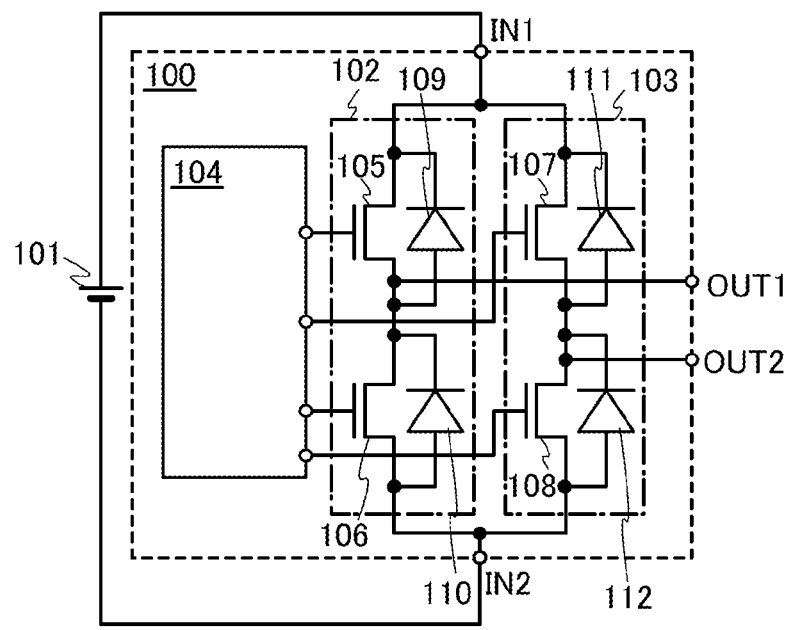
FIGS. 1A and 1B are circuit diagrams to illustrate Embodiment 1.

Embodiments of the present invention will be described below in detail with reference to the drawings. Note that the present invention can be implemented with various modes. It will be readily appreciated by those skilled in the art that modes and details of the present invention can be modified in various ways without departing from the spirit and scope of the present invention. Therefore, the present invention should not be construed as necessarily being as described in the embodiments below. Note that, in the structure of the present invention described below, identical objects in all the drawings are denoted by the same reference numeral.

Note that, the size, layer thickness, signal waveform, and region of each object shown in the drawings and the like of the embodiments are exaggerated for simplicity in some cases. Each object therefore is not necessarily in such scales.

Note that, in this specification, terms such as "first", "second", "third", to "N (N is a natural number)" are used only for preventing confusion between components, and thus do not limit numbers. Note that a natural number refers to 1 or more unless otherwise specified.

Embodiment 1

Figure 1B:
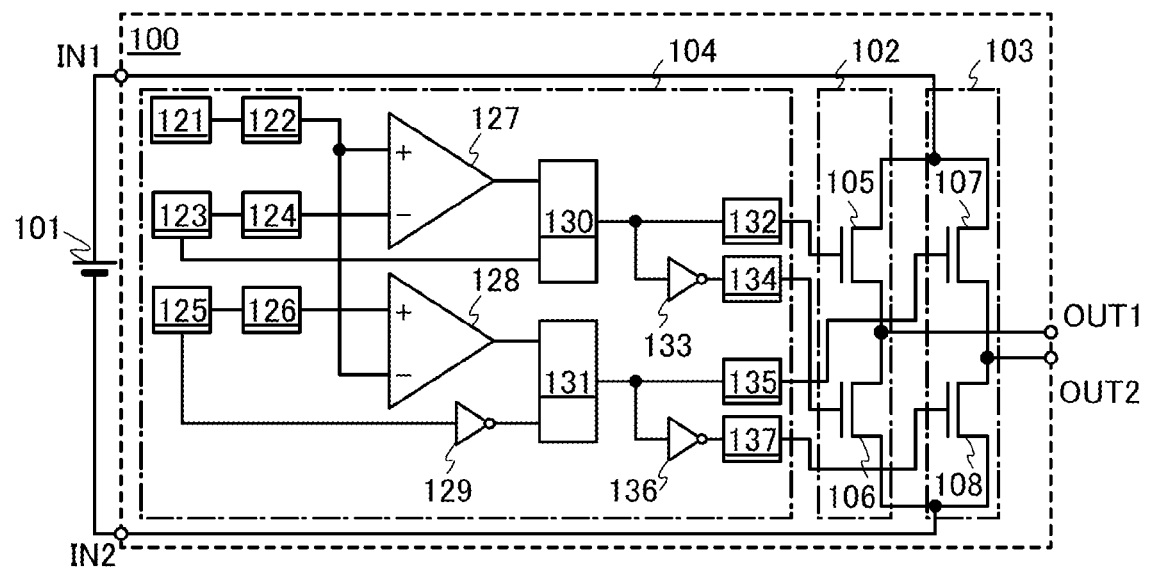

FIGS. 1A and 1B illustrate the configuration of a full-bridge inverter circuit according to one embodiment of the present invention.

FIG. 1A illustrates the configuration of a half-bridge circuit included in the full-bridge inverter circuit. An inverter circuit 100 in FIG. 1A receives a DC signal from a DC power source 101 through input terminals IN1 and IN2, and outputs an AC signal through output terminals OUT1 and OUT2. The inverter circuit 100 includes a first half-bridge circuit 102, a second half-bridge circuit 103, and a pulse width modulation circuit 104.

The first half-bridge circuit 102 includes a high-side transistor 105 and a low-side transistor 106. The second half-bridge circuit 103 includes a high-side transistor 107 and a low-side transistor 108. A diode 109 is provided between a source terminal and a drain terminal of the high-side transistor 105. A diode 110 is provided between a source terminal and a drain terminal of the low-side transistor 106. A diode 111 is provided between a source terminal and a drain terminal of the high-side transistor 107. A diode 112 is provided between a source terminal and a drain terminal of the low-side transistor 108. The diodes 109 to 112 do not have any particular influence on the inverter circuit operation, and thus are omitted in FIG. 1B and FIG. 2. In addition, a combination of the first half-bridge circuit 102 and the second half-bridge circuit 103 is also called a full-bridge circuit.

Gate terminals of the high-side transistor 105, low-side transistor 106, high-side transistor 107, and low-side transistor 108 are connected to the pulse width modulation circuit 104; thus, ON/OFF (conduction state or non-conduction state) of each transistor is controlled. Note that the high-side transistor 105, the low-side transistor 106, the high-side transistor 107, and the low-side transistor 108 serve as switching elements and may be simply called switches.

In the configuration in FIG. 1A, the high-side transistor 105, the low-side transistor 106, the high-side transistor 107, and the low-side transistor 108 are not necessarily a particular type of transistor; they can each be a thin film transistor (TFT) using a non-single-crystal semiconductor film, typically an amorphous silicon film or a polycrystalline silicon film; a transistor using a semiconductor substrate or an SOI substrate; a MOS transistor; a junction transistor; a bipolar transistor, or the like. Although the transistors here are all supposed to be of n-type conductivity in the description of this embodiment, they can be of any other conductivity. For example, the transistors here can be all of p-type conductivity or can be of both p-type conductivity and n-type conductivity.

FIG. 1B illustrates the details of the configuration of the pulse width modulation circuit 104 in FIG. 1A.

The pulse width modulation circuit 104 in FIG. 1B includes a digital sine wave signal generator circuit 121, a sine wave digital-analog converter circuit (a sine wave D/A converter circuit) 122, a first digital sawtooth wave signal generator circuit 123, a first sawtooth wave digital-analog converter circuit (a first sawtooth wave D/A converter circuit) 124, a second digital sawtooth wave signal generator circuit 125, a second sawtooth wave digital-analog converter circuit (a second sawtooth wave D/A converter circuit) 126, a first comparator 127, a second comparator 128, a NOT gate (an inverter) 129, a first AND gate 130, a second AND gate 131, a first level shifter 132, a NOT gate 133, a second level shifter 134, a third level shifter 135, a NOT gate 136, and a fourth level shifter 137.

The digital sine wave signal generator circuit 121 outputs a digital signal for generating a sine wave. The sine wave digital-analog converter circuit 122 outputs a sine wave that is an analog signal generated from the digital signal output by the digital sine wave signal generator circuit 121.

The first digital sawtooth wave signal generator circuit 123 generates a digital signal for generating a first sawtooth wave. The first sawtooth wave digital-analog converter circuit 124 outputs the first sawtooth wave that is an analog signal generated from the digital signal output by the first digital sawtooth wave signal generator circuit 123.

The second digital sawtooth wave signal generator circuit 125 generates a digital signal for generating a second sawtooth wave. The second sawtooth wave digital-analog converter circuit 126 outputs the second sawtooth wave that is an analog signal generated from the digital signal output by the second digital sawtooth wave signal generator circuit 125. Note that the first sawtooth wave and the second sawtooth wave are out of phase with each other by half a cycle.

The first comparator 127 receives the sine wave from the sine wave digital-analog converter circuit 122 through a non-inversion input terminal. The first comparator 127 also receives the first sawtooth wave from the first sawtooth wave digital-analog converter circuit 124 through an inversion input terminal.

The second comparator 128 receives the second sawtooth wave from the second sawtooth wave digital-analog converter circuit 126 through a non-inversion input terminal. The second comparator 128 also receives the sine wave from the sine wave digital-analog converter circuit 122 through an inversion input terminal.

The first AND gate 130 receives an output signal of the first comparator 127 through a first input terminal. The first AND gate 130 also receives a first control signal from the first digital sawtooth wave signal generator circuit 123 through a second input terminal. The first control signal is generated from higher-order bits of the digital signal for generating the first sawtooth wave.

The second AND gate 131 receives an output signal of the second comparator 128 through a first input terminal. The second AND gate 131 also receives a signal from the NOT gate 129 through a second input terminal. This signal is generated by the NOT gate 129 from a second control signal that is output from the second digital sawtooth wave signal generator circuit 125. The second control signal is generated from higher-order bits of the digital signal for generating the second sawtooth wave.

The first level shifter 132 is used to increase the voltage level of a signal from the output terminal of the first AND gate 130 to a voltage level high enough to turn on the high-side transistor 105.

The second level shifter 134 is used to increase the voltage level of a signal from the NOT gate 133 to a voltage level high enough to turn on the low-side transistor 106. The signal is generated by the NOT gate 133 from a signal output from the output terminal of the first AND gate 130.

The third level shifter 135 is used to increase the voltage level of a signal from the output terminal of the second AND gate 131 to a voltage level high enough to turn on the high-side transistor 107.

The fourth level shifter 137 is used to increase the voltage level of a signal from the NOT gate 136 to a voltage level high enough to turn on the low-side transistor 108. The signal is generated by the NOT gate 136 from a signal output from the output terminal of the second AND gate 131.

Note that the first level shifter 132, the second level shifter 134, the third level shifter 135, and the fourth level shifter 137 can be omitted if the voltage levels of signals output from the first AND gate 130 and the second AND gate 131 are high enough to turn on the high-side transistor 105, the low-side transistor 106, the high-side transistor 107, and the low-side transistor 108.

Figure 2:
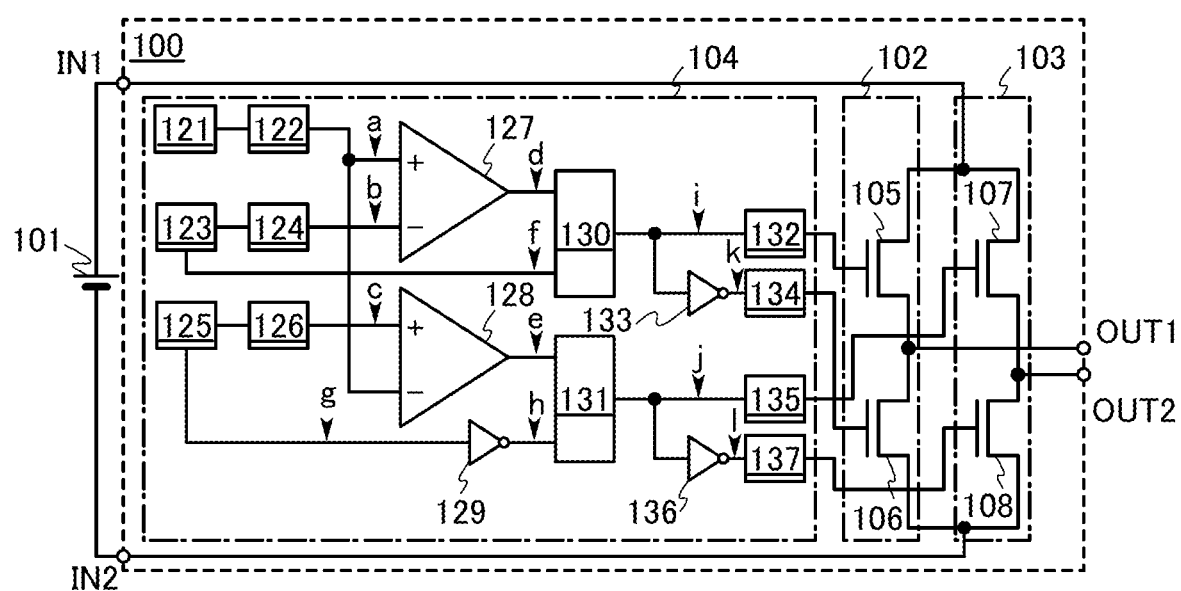
FIG. 2 is a circuit diagram to illustrate Embodiment 1.

Next, prior to description of the operation of the pulse width modulation circuit 104 in FIG. 1B, the reference numerals of signals output from the circuits and gates will be shown. Hereinafter, as illustrated in FIG. 2, "a" denotes an output signal of the sine wave digital-analog converter circuit 122, "b", an output signal of the first sawtooth wave digital-analog converter circuit 124, "c", an output signal of the second sawtooth wave digital-analog converter circuit 126, "d", an output signal of the first comparator 127, "e", an output signal of the second comparator 128, "f", the first control signal output from the first digital sawtooth wave signal generator circuit 123, "g", the second control signal of the second digital sawtooth wave signal generator circuit 125, "h", an output signal of the NOT gate 129, "i", an output signal (a first signal) of the first AND gate 130, "j", an output signal (a second signal) of the second AND gate 131, "k", an output signal of the NOT gate 133, and "l", an output signal of the NOT gate 136.

Figure 3A:
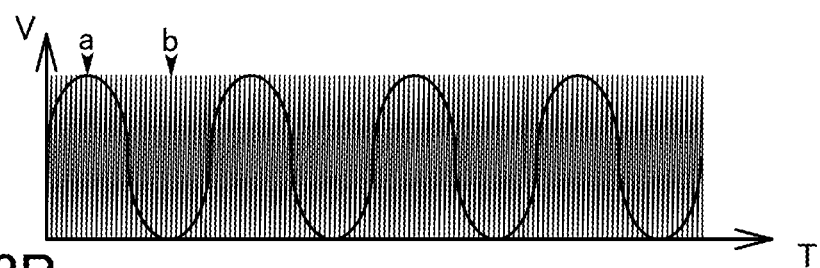
FIGS. 3A to 3C are waveform diagrams to illustrate Embodiment 1.

FIG. 3A illustrates the waveform of a sine wave that is the output signal of the sine wave digital-analog converter circuit 122 and the waveform of a first sawtooth wave that is the output signal of the first sawtooth wave digital-analog converter circuit 124. Note that the sine wave and the first sawtooth wave are signals having the same voltage amplitude as illustrated in FIG. 3A. The amplitude voltage is estimated from a difference between a maximum voltage level and a minimum voltage level. When the sine wave has a frequency of, for example, about 50 Hz, the first sawtooth wave preferably has a frequency of about 250 kHz. Setting the frequency of the first sawtooth wave higher than that of the sine wave allows an AC signal with smaller distortions to be output from the inverter circuit 100.

In the drawings used hereinafter, the sine wave and the first sawtooth wave may be exaggerated or roughly illustrated. For example, a signal based on a magnitude relation between the sine wave and the first sawtooth wave is illustrated with such a resolution that the signal can be graphically expressed.

Figure 3B:
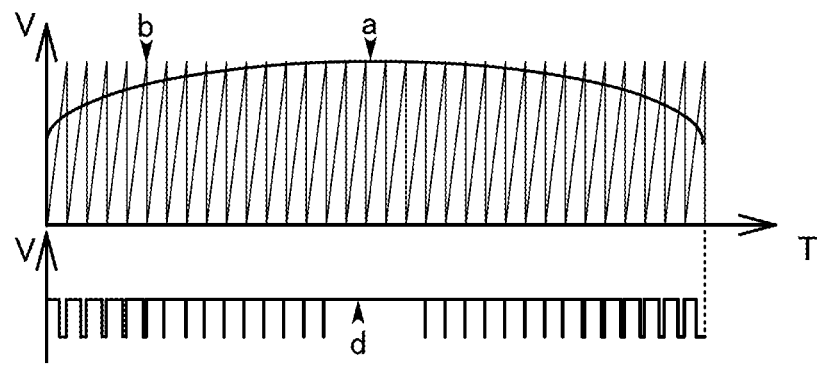
Figure 3C:
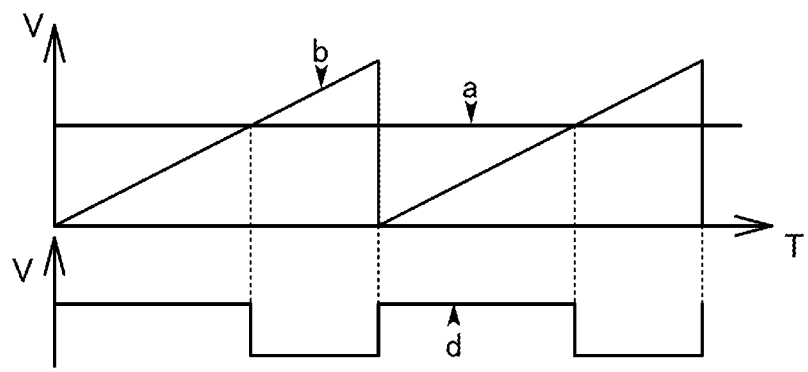

Like FIG. 3A, FIG. 3B illustrates the waveform of the sine wave that is the output signal of the sine wave digital-analog converter circuit 122 and the waveform of the first sawtooth wave that is the output signal of the first sawtooth wave digital-analog converter circuit 124, but in an enlarged form. FIG. 3C illustrates the waveform of the sine wave that is the output signal of the sine wave digital-analog converter circuit 122 and the waveform of the first sawtooth wave that is the output signal of the first sawtooth wave digital-analog converter circuit 124 in a more enlarged form than in FIG. 3B.

As illustrated in FIGS. 3B and 3C, the first comparator 127 outputs a high-level (H level) signal when the voltage level of the sine wave is higher than that of the first sawtooth wave. In contrast, the first comparator 127 outputs a low-level (L level) signal when the voltage level of the first sawtooth wave is higher than that of the sine wave. Thus, as illustrated in FIGS. 3B and 3C, the first comparator 127 outputs a pulse width modulated signal.

Figure 4A:
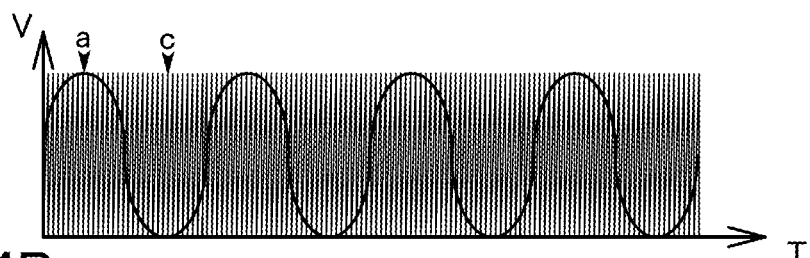
FIGS. 4A to 4C are waveform diagrams to illustrate Embodiment 1.

In a similar manner to FIG. 3A, FIG. 4A illustrates the waveform of the sine wave that is the output signal of the sine wave digital-analog converter circuit 122 and the waveform of a second sawtooth wave that is the output signal of the second sawtooth wave digital-analog converter circuit 126. Note that the sine wave and the second sawtooth wave are signals having the same voltage amplitude as illustrated in FIG. 4A. Note that the frequency of the second sawtooth wave is preferably set equal to that of the first sawtooth wave, e.g., about 250 kHz. Note that as described above, the second sawtooth wave and the first sawtooth wave are out of phase with each other by half a cycle.

Figure 4B:
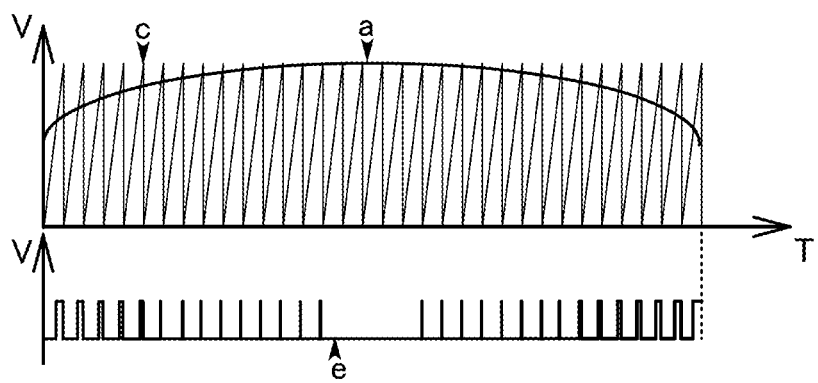
Figure 4C:
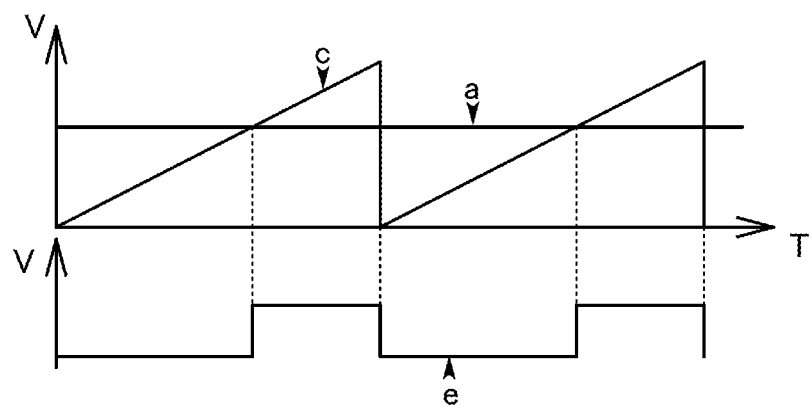

Like FIG. 4A, FIG. 4B illustrates the waveform of the sine wave that is the output signal of the sine wave digital-analog converter circuit 122 and the waveform of the second sawtooth wave that is the output signal of the second sawtooth wave digital-analog converter circuit 126, but in an enlarged form. FIG. 4C illustrates the waveform of the sine wave that is the output signal of the sine wave digital-analog converter circuit 122 and the waveform of the second sawtooth wave that is the output signal of the second sawtooth wave digital-analog converter circuit 126 in a more enlarged form than in FIG. 4B.

As illustrated in FIGS. 4B and 4C, the second comparator 128 outputs an H level signal when the voltage level of the second sawtooth wave is higher than that of the sine wave. In contrast, the second comparator 128 outputs an L level signal when the voltage level of the sine wave is higher than that of the second sawtooth wave. Thus, as illustrated in FIGS. 4B and 4C, the second comparator 128 outputs a pulse width modulated signal.

Figure 5A:
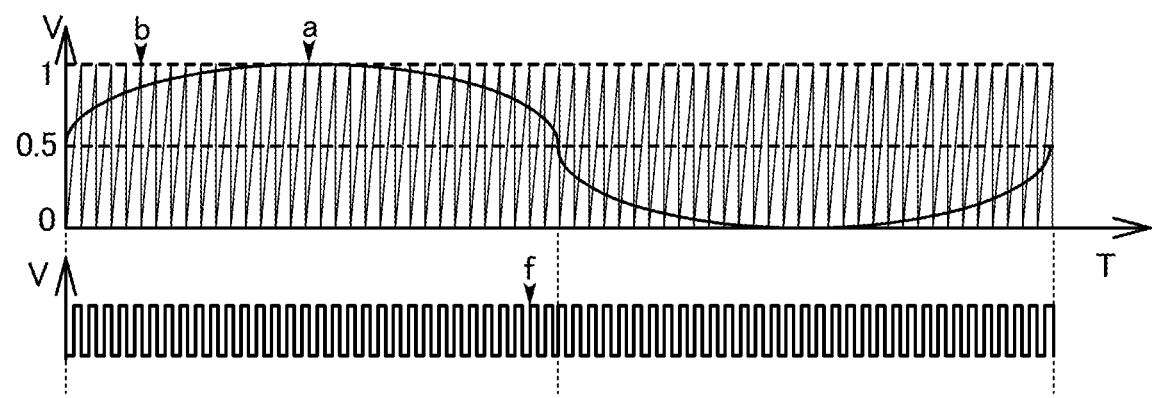
FIGS. 5A and 5B are waveform diagrams to illustrate Embodiment 1.

FIG. 5A illustrates the waveform of the first control signal output from the first digital sawtooth wave signal generator circuit 123. As described above, the first control signal is generated from the higher-order bits of the digital signal for generating the first sawtooth wave. As illustrated in FIG. 5A, when the first sawtooth wave has a maximum voltage level of 1 and a minimum voltage level of 0, the first control signal is high while the voltage level of the sawtooth wave is higher than 0.5. The first control signal is therefore a square wave with a 50% duty cycle as illustrate in FIG. 5A.

Figure 5B:
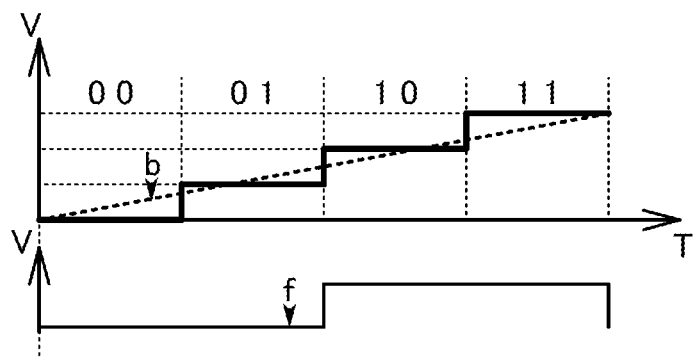

The first control signal will be described with reference to FIG. 5B taking a simple structure as an example. In FIG. 5B, the digital signal for generating the first sawtooth wave from which the first control signal is generated is a binary digital signal, i.e., an original signal for generating the first sawtooth wave which is subjected to digital/analog conversion using four values: "00", "01", "10", and "11". In FIG. 5B, the signal generated from the higher-order bits of the digital signal for generating the first sawtooth wave appears in a period where the digital signal is "10" or "11", and thus can be in the form of the aforementioned square wave with a 50% duty cycle.

Note that the details of the second control signal output from the second digital sawtooth wave signal generator circuit 125 are similar to those of the first control signal.

Figure 6:
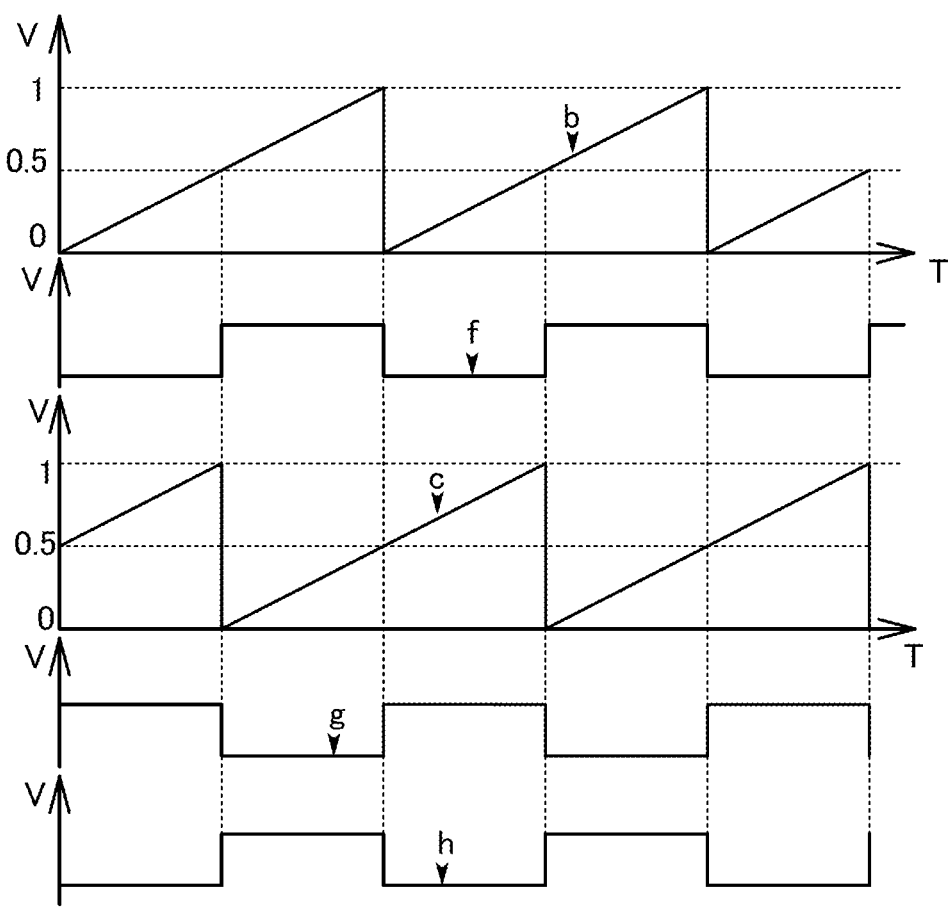
FIG. 6 is a waveform diagram to illustrate Embodiment 1.

FIG. 6 illustrates the first sawtooth wave and the second sawtooth wave along with the waveforms of the first control signal and second control signal. As described above, the first sawtooth wave and the second sawtooth wave are out of phase with each other by half a cycle. For this reason, the first control signal and the second control signal obtained are square waves being in opposite phase to each other as shown in FIG. 6. Consequently, the signal output from the NOT gate 129 which inverts the second control signal ("h" in FIG. 6) is in phase with the first control signal.

As illustrated in FIGS. 3B and 3C, the first comparator 127 outputs an H level signal when the voltage level of the sine wave is higher than that of the first sawtooth wave. In contrast, the first comparator 127 outputs an L level signal when the voltage level of the first sawtooth wave is higher than that of the sine wave. Thus, as illustrated in FIGS. 3B and 3C, the first comparator 127 outputs a frequency modulated signal. Similarly, as illustrated in FIGS. 4B and 4C, the second comparator 128 outputs an H level signal when the voltage level of the second sawtooth wave is higher than that of the sine wave. In contrast, the second comparator 128 outputs an L level signal when the voltage level of the sine wave is higher than that of the second sawtooth wave. Thus, as illustrated in FIGS. 4B and 4C, the second comparator 128 outputs a frequency modulated signal.

Figure 7:
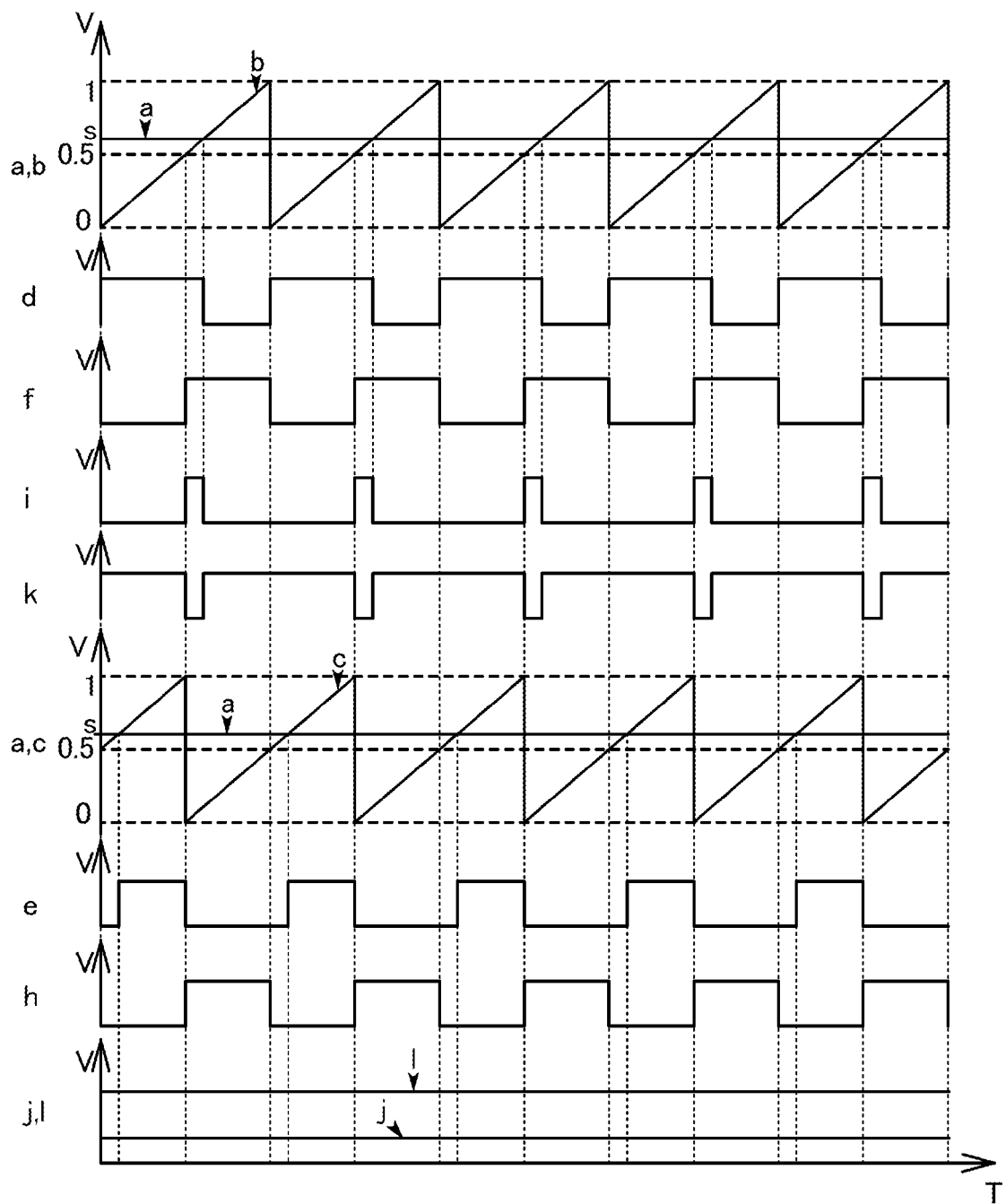
FIG. 7 is a timing diagram to illustrate Embodiment 1.
Figure 8:
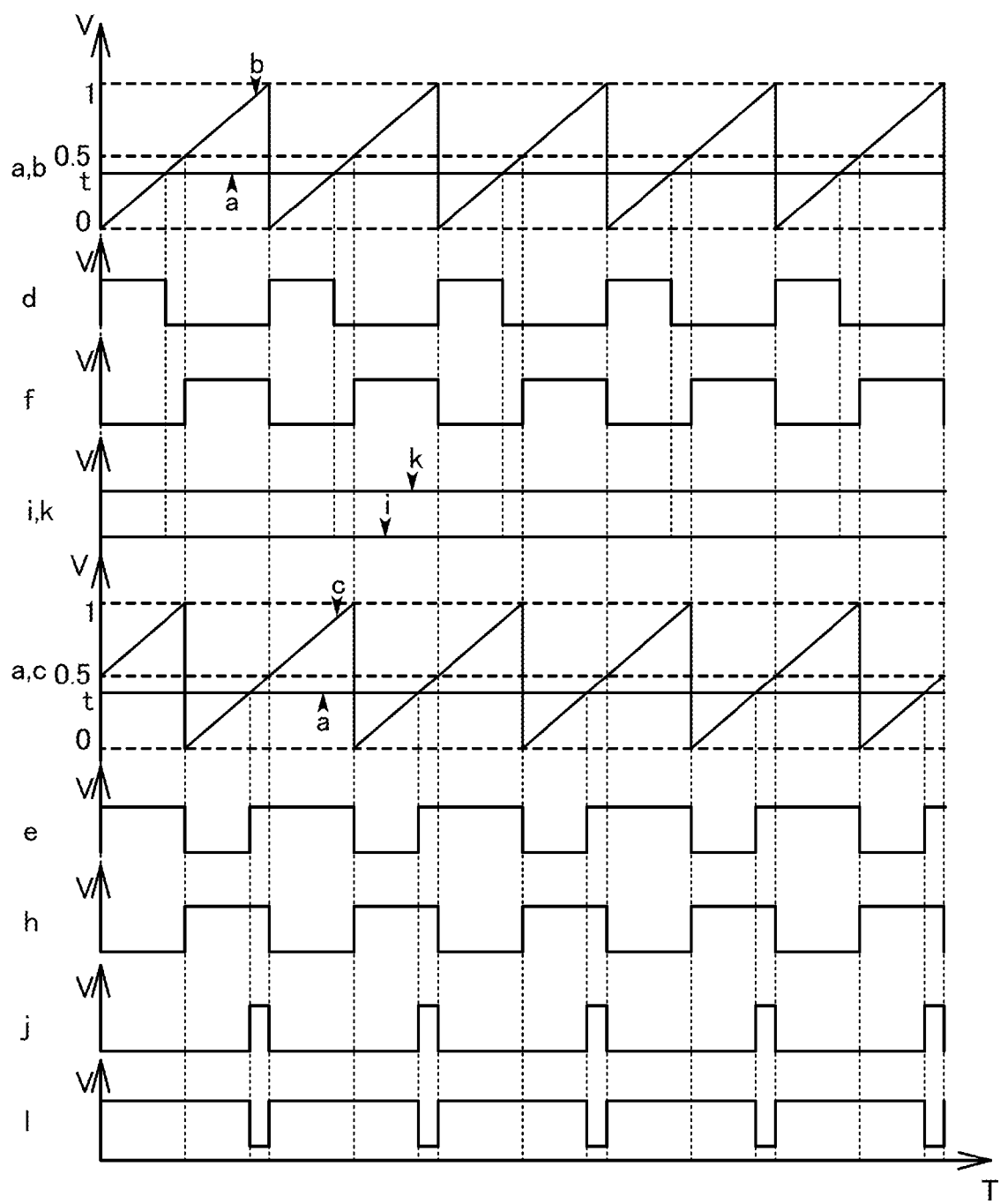
FIG. 8 is a timing diagram to illustrate Embodiment 1.

A relationship between the output signals of the circuits and gates in FIG. 1B will be described with reference to timing diagrams of FIG. 7 and FIG. 8. FIG. 7 illustrates, as an example, output signals obtained when the first sawtooth wave and second sawtooth wave each have a maximum voltage level of 1 and a minimum voltage level of 0, and the sine wave has a fixed voltage level of more than 0.5 which is denoted by "s" (where 0.5<s<1). FIG. 8 illustrates, as an example, output signals obtained when the first sawtooth wave and second sawtooth wave each have a maximum voltage level of 1 and a minimum voltage level of 0, and the sine wave has a fixed voltage level of less than 0.5 which is denoted by "t" (where 0<t<0.5).

The output signal of the first AND gate 130 ("i" in FIG. 7) which is generated from the first sawtooth wave and the sine wave (illustrated in FIG. 7) through the first comparator 127 and the first AND gate 130 has a smaller duty cycle than the output signal of the first comparator 127. The output signal of the first AND gate 130 has a smaller duty cycle than the output signal of the first comparator 127 and is a frequency modulated signal. In addition, the output signal of the NOT gate 133 ("k" in FIG. 7) is the inverted signal of the output signal of the first AND gate 130.

Note that duty cycle represents the percentage of a period where either an H-level signal or an L-level signal appears as a pulse. For the output signal of the first AND gate 130, duty cycle represents the percentage of a period where an H-level signal appears in a cycle. For the output signal of the NOT gate 133, duty cycle represents the percentage of a period where an L-level signal appears in a cycle.

The output signal of the second AND gate 131 ("j" in FIG. 7) which is generated from the second sawtooth wave and the sine wave (illustrated in FIG. 7) through the second comparator 128 and second AND gate 131 is an L-level signal. In addition, the output signal of the NOT gate 136 ("l" in FIG. 7) is the inverted signal (an H-level signal) of the output signal of the second AND gate 131.

In a similar manner to that in FIG. 7, the output signal of the first AND gate 130 ("i" in FIG. 8) which is generated from the first sawtooth wave and the sine wave (illustrated in FIG. 8) through the first comparator 127 and first AND gate 130 is an L-level signal. In addition, the output signal of the NOT gate 133 ("k" in FIG. 8) is the inverted signal (an H-level signal) of the output signal of the first AND gate 130.

In a similar manner to that in FIG. 7, the output signal of the second AND gate 131 ("j" in FIG. 8) which is generated from the second sawtooth wave and the sine wave (illustrated in FIG. 8) through the second comparator 128 and second AND gate 131 has a smaller duty cycle than the output signal of the second comparator 128. The output signal of the second AND gate 131 has a smaller duty cycle than the output signal of the second comparator 128 and is a frequency modulated signal. In addition, the output signal of the NOT gate 136 ("l" in FIG. 8) is the inverted signal of the output signal of the second AND gate 131.

As described with reference to FIG. 7, the output signal of the first AND gate 130 ("i" in FIG. 7) and the output signal of the NOT gate 133 ("k" in FIG. 7) which are generated from the first sawtooth wave and the sine wave illustrated in FIG. 7 have smaller duty cycles than the output signal of the first comparator 127. Similarly, as described with reference to FIG. 8, the output signal of the first AND gate 131 ("j" in FIG. 7) and the output signal of the NOT gate 136 ("l" in FIG. 8) which are generated from the second sawtooth wave and the sine wave illustrated in FIG. 8 have smaller duty cycles than the output signal of the second comparator 128.

Figure 9:
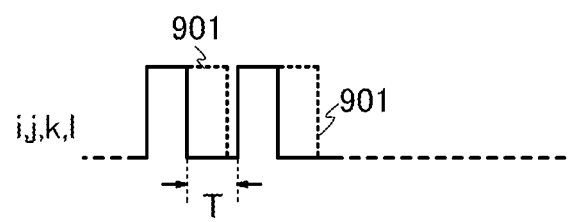
FIG. 9 is a waveform diagram to illustrate Embodiment 1.

As an example, as shown in a waveform diagram of FIG. 9, each of the intervals T of their pulse widths is extended with respect to the influence of the AND operation of the first control signal and the output signal of the first comparator 127 performed by the first AND gate 130; or the AND operation of the signal output from the NOT gate 129 which inverts the second control signal and the output signal of the second comparator 128 performed by the second AND gate 131 (a dotted portion 901 in FIG. 9). This results in a reduction in short-circuit periods during which both the high-side transistor and the low-side transistor are on, thereby reducing distortions in a signal output from the inverter circuit particularly at the time of switching between the ON and OFF states of the first half-bridge circuit and the second half-bridge circuit.

Thus, the inverter circuit of this embodiment can provide a signal with a small duty cycle using an additional simple system in which the first control signal and the second control signal are used in the AND operation. This results in a reduction in short-circuit periods during which both the high-side transistor and the low-side transistor are on, thereby reducing distortions in a signal output from the inverter circuit at the time of switching between the ON and OFF states of the first half-bridge circuit and the second half-bridge circuit.

Embodiment 2

Figure 10:
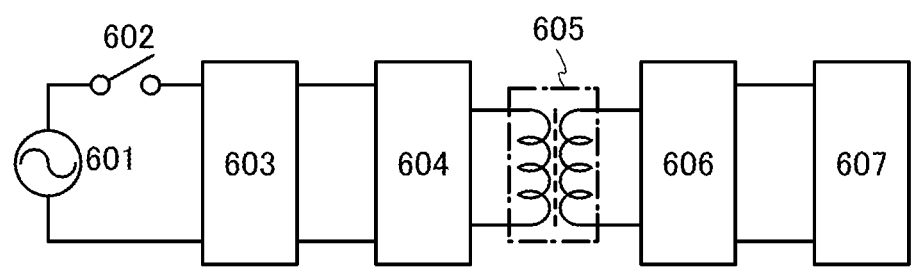
FIG. 10 is a diagram illustrating an example of a power converter circuit.

In this embodiment, an embodiment of the configuration of a power converter circuit (power supply circuit) including the inverter circuit of Embodiment 1 will be described. FIG. 10 illustrates one embodiment of the power converter circuit.

The power converter circuit in FIG. 10 includes an AC power source 601, a switch 602, a converter circuit 603, an inverter circuit 604, a transformer 605, a converter circuit 606, and a load 607. The actual power converter circuit is composed of the converter circuit 603, the inverter circuit 604, the transformer 605, and the converter circuit 606.

The converter circuit 603 in FIG. 10 receives an AC signal from the AC power source 601 when the switch 602 is turned on. The converter circuit 603 steps down the voltage of the AC signal and outputs a rectified and smoothed DC signal generated from the AC signal to the inverter circuit.

The DC signal input to the inverter circuit 604 is converted into an AC signal by the components of Embodiment 1, and then the AC signal is output. Consequently, the AC signal output from the inverter circuit 604 has smaller distortions.

The transformer 605 includes a primary coil and a secondary coil. The AC signal output from the inverter circuit 604 is input to the transformer 605 through the primary coil, and the transformed AC signal is output from the transformer 605 through the secondary coil. It is preferable to step down, in advance, the voltage of the AC signal output from the inverter circuit 604 by the converter circuit 603, because this can downsize the transformer 605.

The converter circuit 606 in FIG. 10 receives the AC signal from the transformer 605. The converter circuit 606 increases the voltage of the AC signal to such a level that the load is operated, and then rectifies and smoothes the AC signal to provide a DC signal of a desired voltage. The DC signal is input to the load 607, so that the load 607 operates.

Note that what is illustrated in the drawing of this embodiment can be freely combined with or replaced with what is described in another embodiment as appropriate.

Embodiment 3

In this embodiment, applications of the power converter circuit of Embodiment 2 will be described. The power converter circuit of Embodiment 2 can be used, for example, in an electric vehicle working with electric power such as battery power.

Application examples for electric vehicles will be described with reference to FIGS. 11A and 11B.

Figure 11A:
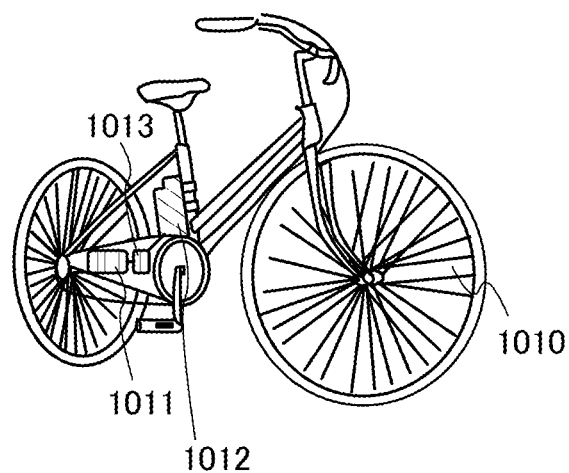
FIGS. 11A and 11B are diagrams illustrating electronic devices.

FIG. 11A illustrates an electric bicycle 1010 as an example application for an electric vehicle including a power converter circuit. The electric bicycle 1010 obtains power when current is fed through a motor 1011. The electric bicycle 1010 includes a battery 1012 and a power converter circuit 1013 which are used to feed current through the motor 1011. Although not illustrated, an additional electric generator or the like may be provided in the electric bicycle 1010 in FIG. 11A for the purpose of charging the battery 1012. The power converter circuit of Embodiment 2 can be used as the power converter circuit 1013. This can reduce distortions in a signal output from an inverter circuit included in the power converter circuit 1013, thereby allowing the electric bicycle 1010 to be driven with fewer problems. Note that pedals in FIG. 11A may be omitted.

Figure 11B:
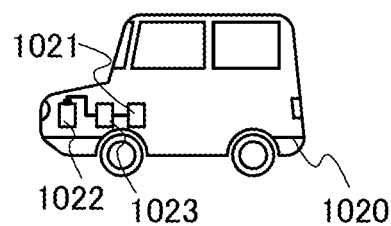
Figure 12A:
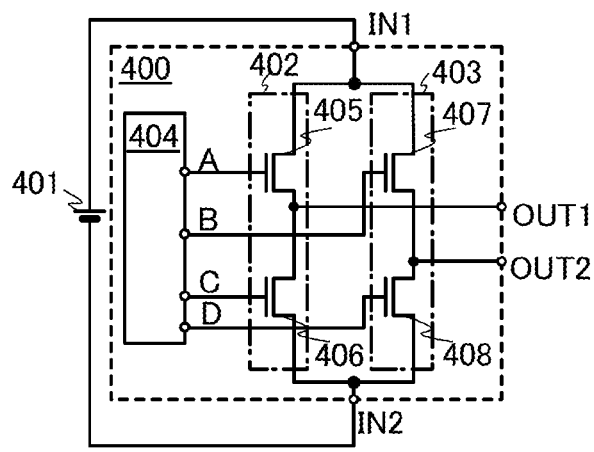
FIGS. 12A to 12C are diagrams to illustrate an inverter circuit.
Figure 12B:
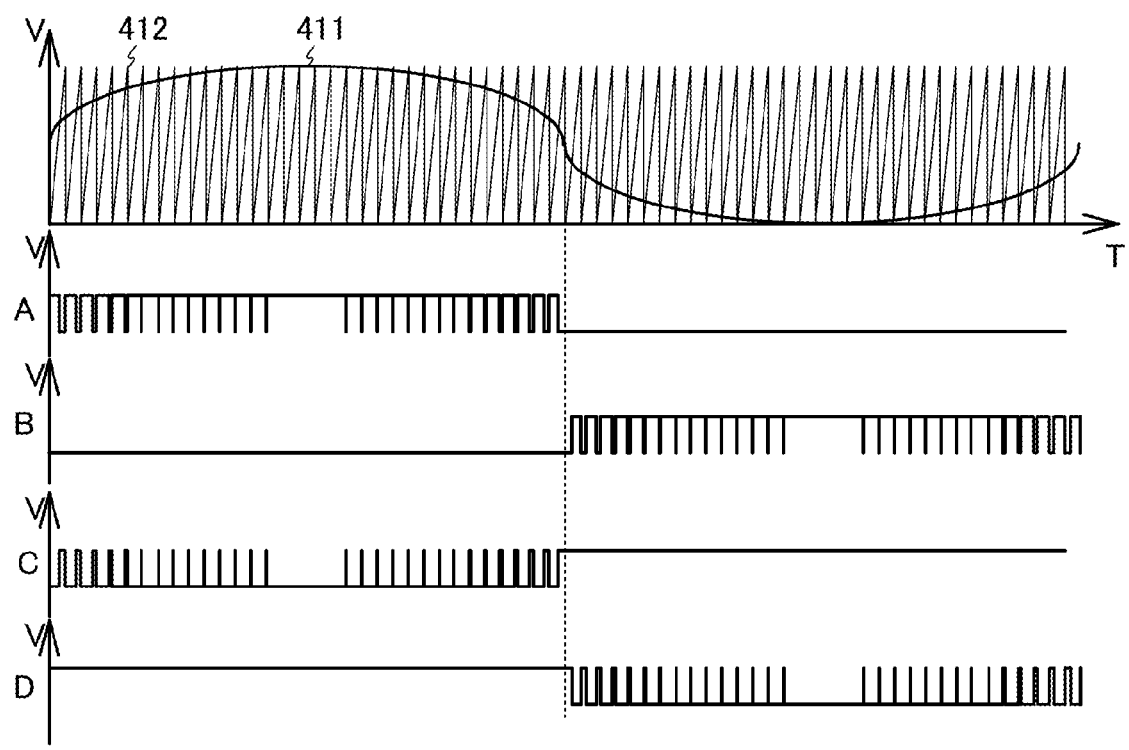
Figure 12C:
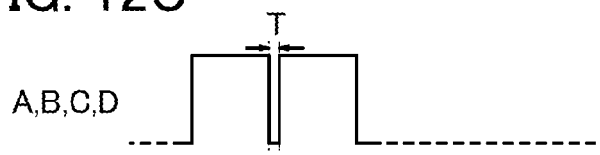

FIG. 11B illustrates an electric car 1020 as an example application for an electric vehicle including a power converter circuit. The electric car 1020 obtains power when current flows through a motor 1021. The electric car 1020 includes a battery 1022 and a power converter circuit 1023 which are used to feed current to the motor 1021. Although not illustrated, an additional electric generator or the like may be provided in the electric car 1020 in FIG. 11B for the purpose of charging the battery 1022. The power converter circuit of Embodiment 2 can be used as the power converter circuit 1023. This can reduce distortions in a signal output from an inverter circuit included in the power converter circuit 1023, thereby allowing the electric car 1020 to be driven with fewer problems.

Note that what is illustrated in the drawing of this embodiment can be freely combined with or replaced with what is described in another embodiment as appropriate.

This application is based on Japanese Patent Application serial no. 2010-175001 filed with Japan Patent Office on Aug. 4, 2010, the entire contents of which are hereby incorporated by reference.

What is claimed is:

1. An inverter circuit comprising:
   a full-bridge circuit comprising:
      a first half-bridge circuit; and
      a second half-bridge circuit; and
   a pulse width modulation circuit comprising:
      a sine wave signal generator circuit configured to generate a sine wave;
      a first circuit configured to control the first half-bridge circuit in accordance with a first signal generated in accordance with the sine wave, a first sawtooth wave, and a first digital signal, the first circuit comprising:
         a first digital sawtooth wave signal generator circuit configured to generate the first digital signal,
         wherein the first sawtooth wave is a signal produced by converting the first digital signal into an analog signal; and
      a second circuit configured to control the second half-bridge circuit in accordance with a second signal generated in accordance with the sine wave, a second sawtooth wave, and a second digital signal, the second circuit comprising:
         a second digital sawtooth wave signal generator circuit configured to generate the second digital signal,
         wherein the second sawtooth wave is a signal produced by converting the second digital signal into an analog signal,
         wherein the second sawtooth wave is out of phase with the first sawtooth wave.

2. The inverter circuit according to claim 1,
   wherein the first half-bridge circuit comprises a first high-side transistor and a first low-side transistor,
   wherein the second half-bridge circuit comprises a second high-side transistor and a second low-side transistor,
   wherein the first signal is supplied to the first high-side transistor and the first low-side transistor through a first level shifter, and
   wherein the second signal is supplied to the second high-side transistor and the second low-side transistor through a second level shifter.

3. The inverter circuit according to claim 2, wherein the second sawtooth wave is out of phase with the first sawtooth wave by half a cycle.

4. The inverter circuit according to claim 1,
   wherein the first digital sawtooth wave signal generator circuit is configured to generate a first control signal,
   wherein high-level signal of the first control signal is generated in accordance with higher-order bits of the first digital signal and low-level signal of the first control signal is generated in accordance with lower-order bits of the first digital signal,
   wherein the second digital sawtooth wave signal generator circuit is configured to generate a second control signal, and
   wherein high-level signal of the second control signal is generated in accordance with higher-order bits of the second digital signal and low-level signal of the second control signal is generated in accordance with lower-order bits of the second digital signal.

5. The inverter circuit according to claim 4, wherein a duty cycle of the first control signal and a duty cycle of the second control signal are 50%.

6. A power converter circuit comprising the inverter circuit according to claim 1.

7. An electric vehicle comprising the power converter circuit according to claim 6.

8. The inverter circuit according to claim 1,
   wherein the first circuit further comprises a first AND gate and a first comparator,
   wherein the second circuit further comprises a second AND gate and a second comparator,
   wherein the first AND gate is configured to generate the first signal in accordance with a first output signal and a first control signal,
   wherein the first comparator is configured to generate the first output signal in accordance with the sine wave and the first sawtooth wave,
   wherein the second AND gate is configured to generate the second signal in accordance with a second output signal and an inverted signal of a second control signal, and
   wherein the second comparator is configured to generate the second output signal in accordance with the sine wave and the second sawtooth wave.

9. The inverter circuit according to claim 8, wherein the first control signal and the second control signal are square waves being in opposite phase to each other.

10. The inverter circuit according to claim 1,
    wherein the first digital sawtooth wave signal generator circuit is configured to generate a first control signal in accordance with higher-order bits of the first digital signal and lower-order bits of the first digital signal, and
    wherein the second digital sawtooth wave signal generator circuit is configured to generate a second control signal in accordance with higher-order bits of the second digital signal and lower-order bits of the second digital signal.

11. The inverter circuit according to claim 1, wherein the sine wave is a signal produced by generating a digital sine wave signal with a digital sine wave signal generator circuit and converting the digital sine wave signal into an analog signal.

12. The inverter circuit according to claim 1,
wherein the first half-bridge circuit comprises a first high-side transistor and a first low-side transistor,
wherein the second half-bridge circuit comprises a second high-side transistor and a second low-side transistor,
wherein the first circuit is configured to control the first high-side transistor in accordance with the first signal and to control the first low-side transistor in accordance with an inverted signal of the first signal, and
wherein the second circuit is configured to control the second high-side transistor in accordance with the second signal and to control the second low-side transistor in accordance with an inverted signal of the second signal.

13. The inverter circuit according to claim 12, wherein the first signal, the inverted signal of the first signal, the second signal, and the inverted signal of the second signal are supplied to the first high-side transistor, the first low-side transistor, the second high-side transistor, and the second low-side transistor through level shifters, respectively.

* * * * *